(12) United States Patent
Faber et al.

(10) Patent No.: US 8,454,886 B2
(45) Date of Patent: Jun. 4, 2013

(54) DURABLE HONEYCOMB STRUCTURES

(75) Inventors: Margaret Kathleen Faber, Corning, NY (US); Robert Gordon Lawrence, Corning, NY (US); Weiguo Miao, Big Flats, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1148 days.

(21) Appl. No.: 11/605,632

(22) Filed: Nov. 29, 2006

(65) Prior Publication Data

US 2008/0124504 A1 May 29, 2008

(51) Int. Cl.
*B28B 1/00* (2006.01)
(52) U.S. Cl.
USPC ............................................. 264/630
(58) Field of Classification Search
USPC .................................. 264/630, 631
See application file for complete search history.

(56) References Cited

U.S. PATENT DOCUMENTS

| | | | |
|---|---|---|---|
| 5,223,188 A | 6/1993 | Brundage et al. | 264/26 |
| 5,429,779 A * | 7/1995 | Locker et al. | 264/40.1 |
| 5,545,450 A | 8/1996 | Andersen et al. | 428/34.5 |
| 5,626,916 A | 5/1997 | Kishi et al. | 427/386 |
| 5,820,967 A * | 10/1998 | Gadkaree | 428/116 |
| 6,107,976 A | 8/2000 | Purinton | 343/872 |
| 6,113,829 A | 9/2000 | Bookbinder et al. | 264/211.11 |
| 6,287,510 B1 * | 9/2001 | Xun | 264/630 |
| 6,372,033 B1 | 4/2002 | Chalasani et al. | 106/140.1 |
| 7,122,612 B2 | 10/2006 | Tao et al. | 526/317.1 |
| 2003/0047829 A1 * | 3/2003 | Gadkaree | 264/44 |
| 2004/0051196 A1 * | 3/2004 | Otsuka et al. | 264/41 |

FOREIGN PATENT DOCUMENTS

| | | |
|---|---|---|
| EP | 0 559 437 | 9/2003 |
| GB | 1 300 319 | 12/1972 |
| JP | 09-059076 | 3/1997 |
| JP | 2001-513481 | 9/2001 |
| JP | 2001-514099 | 9/2001 |
| JP | 2005-193573 | 7/2005 |
| JP | 2007-261925 | 10/2007 |

OTHER PUBLICATIONS

Japanese application No. 2009-539271, dated Nov. 6, 2012, "Notice of Grounds for Rejection", pp. 1-5.
U.S. Appl. No. 11/394,594, filed Mar. 30, 2006, W. Maio et al.

* cited by examiner

*Primary Examiner* — Joseph S Del Sole
*Assistant Examiner* — Erin Snelting
(74) *Attorney, Agent, or Firm* — Matthew B. McNutt

(57) ABSTRACT

A method for manufacturing an inorganic honeycomb structure that resists water damage after drying comprises compounding a base batch mixture including inorganic powders, a batch cross-link agent, an aqueous vehicle, and a cross-linkable batch constituent, and forming the batch mixture into a honeycomb core or skin component while reacting the cross-link agent with cross-linkable batch constituent.

11 Claims, 2 Drawing Sheets

DURABLE HONEYCOMB STRUCTURES

BACKGROUND OF THE INVENTION

The present invention relates to the manufacture of ceramic honeycomb structures of the kinds used for particulate filters, catalyst supports, and heat exchangers, and in particular to the manufacture of ceramic honeycombs exhibiting improved resistance to water absorption in the unfired state, and thus increased structural integrity when contacted with aqueous media.

Honeycomb structures having transverse cross-sectional channel or cellular densities of approximately 1 to 200 cells or more per square centimeter have been adapted to a number of uses, including use as solid particulate wall-flow filter bodies, catalyst supports, and stationary heat exchangers. For wall-flow filter applications the honeycomb structures are conventionally provided with channel-blocking plugs or seals at opposite ends of alternate channels, thereby establishing filtration flowpaths that traverse the porous ceramic walls of the structures and thus provide for the efficient trapping of particulates within the honeycomb structure. Unplugged catalyst supports and heat exchangers are also in widespread commercial use.

As illustrated in the drawings, reference numeral 10 (FIG. 1) generally designates a solid porous ceramic honeycomb body of conventional type that is typically fabricated via well known honeycomb extrusion and plugging processes. Body 10 includes a honeycomb core structure 12 formed by a matrix of intersecting, thin, porous walls 14, and it may further comprise and extruded or after-applied outer wall or skin 15. The walls 14 extend across and between a first end 13 that includes a first end face 18, and a second end 17 that includes an opposing second end face 20, walls 14 thus forming a large number of adjoining hollow cells or channels 22 which extend between and are open at the end faces 18, 20 of the filter body 10.

To form a filter from this honeycomb structure 10 (FIGS. 2 and 3), one end of each of the cells 22 is sealed, a first subset 24 of the cells 22 being sealed at the first end face 18, and a second subset 26 of the cells 22 being sealed at the second end face 20. Either of the end faces 18, 20 may be used as the inlet face of resulting filter 10.

A typical method for manufacturing the honeycomb structure 12 described above includes the steps of compounding a powder batch mixture comprising inorganic powders, an aqueous vehicle, and one or more organic cross-linkable batch constituents such as organic binders, lubricants and plasticizers, and thereafter forming the batch mixture, e.g. by extrusion through a honeycomb die, to form a honeycomb extrudate. This extrudate is then dried, cut and fired to sinter or reaction sinter the inorganic powders into unitary ceramic structures of honeycomb configuration. Plugging of the honeycombs to produce wall flow filter bodies may be carried out before or after drying or firing.

Depending upon the design of the honeycomb extrusion dies and the honeycomb forming process, honeycomb structures produced as above described may be directly extruded with integral skin layers, or they may be formed as honeycomb core bodies without permanent skin layers. In the latter case, a relatively thick, after-applied surrounding skin 57 (FIG. 4) is generally provided on the core bodies. Such skins are typically provided through a subsequent coating or wrapping of the cores with a powder batch mixture like that used to form the honeycomb core bodies, which is then dried. The process of coating or "skinning" can be carried out after the formed honeycomb core bodies have been dried, or even after they have been fired.

For many applications, honeycombs fabricated as above described must be subjected to supplemental processing with aqueous media, for example, to deposit washcoats or catalyst coatings thereon or to apply passivating pre-coatings or cover coatings to protect or condition the honeycombs for further processing or use. Generally, such processing is not harmful if the honeycombs and/or skin layers have been fully fired. However, if the honeycomb core, or skin, or both have not been fired, then the unfired components of the honeycomb still retain moisture and batch conditioning additives such as cellulosic binders that are prone to the absorption of water during further processing. Such absorption can be particularly problematic to the extent that it causes swelling or structural degradation of the honeycomb structure or honeycomb skin layers.

For the mass production of such honeycomb products, it is highly desirable to be able to reduce the associated cycle time for production as much as possible, while maintaining certain quality standards in the resultant filters. Thus methods for manufacturing honeycomb structures for use as filters, flow-through catalyst supports, or heat exchangers that are compatible with the application of washcoats, catalyst coatings or other coatings from aqueous media while maintaining or improving the overall structural integrity of the resultant products would offer substantial production cost and quality advantages.

SUMMARY OF THE INVENTION

We have found that many of the problems relating to water absorption in dried honeycomb structures or their components can be addressed if the honeycombs or honeycomb components are formed from inorganic powder batch mixtures that include a batch cross-link agent to promote the cross-linking of organic batch constituents or constituents present in the mixtures prior to contact with water-based media. Such crosslinking can reduce water absorption by the honeycomb components and thereby increase the structural integrity of the honeycombs.

In a first aspect, therefore, the present invention provides a method for manufacturing a honeycomb structure that comprises the basic steps of compounding a powder batch mixture comprising at least one inorganic powder, an aqueous vehicle, at least one cross-linkable batch constituent such as an organic binder, and at least one batch cross-link agent for the cross-linkable batch constituent. The thus prepared batch mixture is next formed into a green cellular core and/or skin component of a honeycomb structure, and then dried to remove the bulk of the aqueous vehicle therefrom. Finally, either concurrently with or subsequent to the compounding, forming or drying steps, the batch cross-link agent is reacted with at least the cross-linkable batch constituent. The cross-linking reactions generally involve reactive organic components of the powder batch mixtures, although crosslinking with or among inorganic components of the batch may also occur.

In another aspect the invention includes inorganic powder batch mixtures comprising at least one inorganic powder, an aqueous vehicle, at least one cross-linkable batch constituent, and at least one batch cross-link agent for the cross-linkable batch constituent. Such batch mixtures are advantageously employed to provide inventive green honeycomb structures, or core or skin components thereof, composed of such mixtures of inorganic powder, aqueous vehicle, cross-linkable batch constituent(s), and batch cross-link agent(s) for such cross-linkable batch constituent(s).

In yet another aspect, the invention provides honeycomb structures comprising dried cellular core or skin components composed of a mixture of at least one inorganic powder together with a cross-linked reaction product of a batch cross-link agent and a cross-linkable batch constituent. The reaction of the batch cross-link agent with the cross-linkable batch constituent produces a dried honeycomb core or skin component exhibiting much higher resistance to water absorption and structural damage than exhibited by a dried honeycomb or honeycomb component absent the batch cross-link agent. Thus honeycombs incorporating such reaction products can be treated with aqueous media, such as a catalyst, washcoating, or passivating solutions, without undergoing structural damage as a consequence of the exposure to water.

BRIEF DESCRIPTION OF THE DRAWINGS

These and other aspects and advantages of the invention will be further described and understood with reference to the following written specification, claims and appended drawings, wherein:

DETAILED DESCRIPTION OF THE INVENTION

Figure 1:
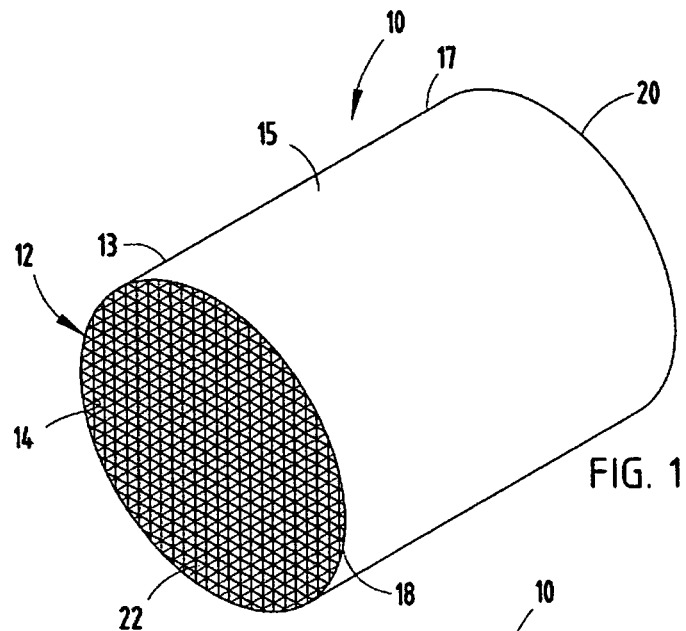
FIG. 1 is a perspective view of an extruded filter body including a first end having a plurality of open-ended cell channels.
Figure 2:
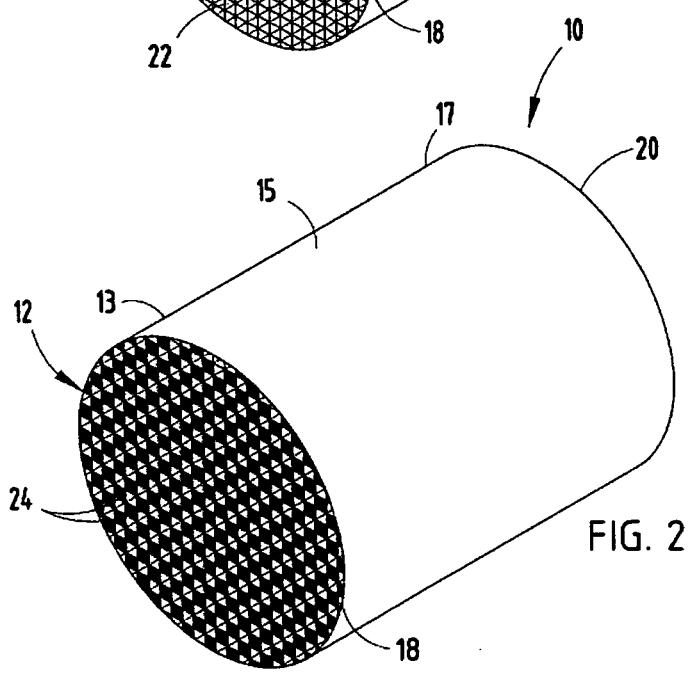
FIG. 2 is a perspective view of the extruded filter body, wherein a first subset of the cell channels are plugged and a second subset of the channels are open-ended.
Figure 3:
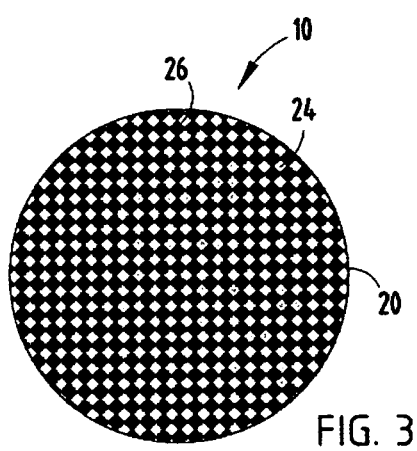
FIG. 3 is an end view of the filter body of FIG. 2 wherein the first subset of the cell channels are open-ended and a second subset of the cell channels are plugged.
Figure 4:
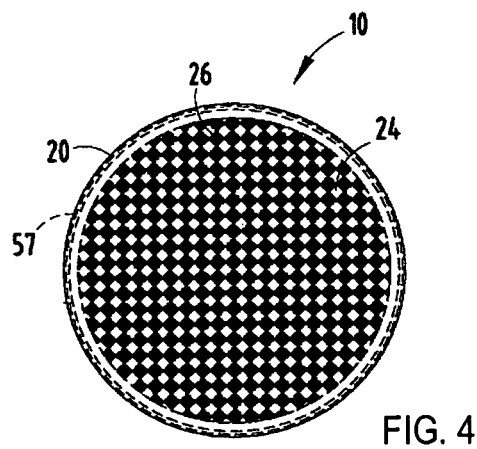
FIG. 4 is an end view of the filter body if FIG. 3 additionally including a thick applied skin layer disposed on the filter body.

While the methods of the invention are generally applicable to the manufacture of ceramic honeycomb structures from inorganic powder batches comprising a water vehicle and water-soluble constituents, the following descriptions and examples are presented with particular reference to dried but unfired honeycomb coatings or skins, which coatings or skins have been particularly susceptible to water damage after drying unless or until they have been fired.

Ceramic honeycomb structural components formed from powder batches comprising inorganic powder constituents typically include inorganic powders such as oxides, nitrides, carbides, silicates, titanates, aluminates, and other metallic compounds that will sinter or reaction-sinter at high temperatures to produce one or more stable ceramic materials of silicate, aluminate, titanate, nitride and/or carbide structure. Specific examples of such inorganic powders include clay, talc, silica, other silicate, alumina, or magnesia sources, as well as pre-reacted or naturally occurring crystalline materials such as mullite, zeolite, cordierite, aluminum titanate, silicon carbide, silicon nitride, or the like.

Powder batches formulated as described are typically plasticized or blended prior to extrusion or other forming of green honeycomb core or skin elements through the addition of a water vehicle and one or more cross-linkable batch constituents selected from the group including binders, lubricants, surfactants, and the like. These cross-linkable batch constituents are generally organic compounds, and they are in many cases "water-active" in that they at least partly water soluble or water-swelling (water absorbing). The most common of these are the cellulosic binders, including for example methyl cellulose, hydroxypropyl methyl cellulose, and other cellulose derivatives that are used to bind the various powder batch constituents into strong dried green honeycomb structures, and that are typically water soluble.

The method of the invention has particular application to current processes for the manufacture of honeycomb structures for large catalyst supports or particulate filters useful for the treatment of exhaust gases from heavy-duty diesel engines. In many cases the honeycomb skin components of these supports or filters are not directly extruded with the honeycomb cores, but instead are routinely applied to extruded core components via ceramic powder pastes or slurries applied to the exteriors of the extruded cores after the latter have been dried, or even fired. These ceramic powder "skinning" preparations typically also incorporate cellulosic binders.

Cellulosic binders, or other batch conditioners that will absorb water when present in dried honeycomb cores or skins, are considered to be a primary cause of structural defects that can arise in the event that a dried honeycomb or honeycomb skin component is contacted with water. Water contact commonly occurs as the honeycomb cores and/or skins are exposed to aqueous catalyst solutions, or alternatively, as dried but unfired honeycomb core components are contacted with water-containing ceramic pastes or slurries that may be used to apply skin layers to honeycomb core structures.

Referring more particularly to the manufacture of large honeycombs as above described, a typical process for making such a honeycomb will comprise extruding a plasticized powder batch into a green honeycomb structure, drying or firing the green honeycomb structure, coating the dried or fired honeycomb structure with a coating mixture comprising a ceramic powder, a cellulose binder, and water to form a coated honeycomb structure, and drying the structure and coating.

In accordance with one aspect of the invention, the coating mixture comprising ceramic powder, binder and water will be modified through the addition of a batch cross-link agent. The inclusion of this batch cross-link agent within the ceramic powder batch used to form the coating enables the use of a cross-linking step after coating application which allows the honeycomb structure to be safely treated with aqueous media after the coating has dried. Aqueous solutions, such as solutions comprising a catalyst, can therefore be applied to the coated honeycomb structure without damage to the skin coating.

Without intending to be bound by theory, it is presently thought that, as a result of the cross-linking reaction, the re-hydration of the cellulosic binder is reduced, thereby making the honeycomb structure substantially water resistant during subsequent coating processes. Cross-linking reduces or eliminates the swelling of the binder that can occur during subsequent coating processes, and the structural degradation of the core or skin caused by such swelling. Thus the invention solves the problem of leaving a non-cross linked water soluble binder or other water-soluble component (e.g. methyl cellulose) remaining in unreacted form within a dried honeycomb core or skin, which component can later react with any water present in the environment or in aqueous media used in applying catalyst or other coatings to the honeycombs.

In some embodiments of this process, the batch cross-link agent is one that cross-links the cellulosic binder through reactions with hydroxyl groups present within the binder, e.g., via condensation or a ring-open mechanism. However, other cross-linking reactions with the cellulose binder or with other organic constituents of the coating mixture can also provide good resistance to water re-absorption by the coating. Among the cross-link agents suitable for cross-linking cellulosic binders as described are those selected from a group consisting of formaldehyde, dialdehyde, acrylic anhydride, diisocyanate, epihalohydrin, polyamides, polyacrolein and polyimines.

Activation of batch cross-link agents present in honeycomb skins or other honeycomb components to effect cross-linking of the binder or other cross-linkable constituent will generally occur between the time the skin or other component has been formed and before or during the process of finally drying that component. In some cases, the active application of activation energy, e.g., heat, light, or other electromagnetic energy may be useful to accelerate and/or to complete the cross-linking reactions. Examples of suitable thermal accelerating methods include microwave irradiation and oven drying, electromagnetic activation could be accomplished by uv irradiation of the skin layers. Normally, however, simply drying the coating or core element may secure cross-linking to a degree adequate to protect the dried material from moisture attack.

The amount of cross-link agent utilized within any particular inorganic powder batch will of course depend in part on the kind and quantity of binder or other batch constituents taking part in the cross-linking reaction. Particular examples of coating batches containing cross-link agents are set forth in Table I below. The batches disclosed are suitable for application to honeycomb structures of conventional cordierite or aluminum titanate composition, in that the inorganic powders components of the batches are matched to one of these two honeycomb compositions in terms of chemical composition and thermal expansion after drying. Powder concentrations in coating batches are simply adjusted to achieve an appropriate paste or slurry consistency or viscosity for efficient coating application, depending upon in part upon the particular coating application method, e.g., spray coating, dip coating, doctor blade application, etc., to be employed. Inorganic powder particle sizes may also be controlled and selected, with combinations of different particle diameter fractions being useful to help control coating solution flowability and/or dried coating properties such as density and durability.

Suitable binders for use in these coating batches include cellulosic compounds such as methyl cellulose or hydroxypropyl methylcellulose, these compounds being commercially available from the Dow Chemical Company, Midland, Mich., U.S.A. Typical concentrations of these binders in coating batches useful for applying skin layers to dried or fired ceramic honeycombs are in the range of 0.1-2% by weight of the wet coating batch.

The proportion of cross-link agent present in the batch will depend principally on the quantity of cross-linkable batch species (cellulosic binders and/or others) present in the batch mixture. For mixtures wherein cellulosic binders constitute the principal cross-linkable species, cross-link agents in concentrations of about 0.1-5% by weight of the wet coating batch may suitably be used.

The batch mixtures of the invention may additionally include other conventional constituents that may be present to modify coating behavior, extrusion behavior, and/or the properties of the resulting honeycomb cores or skin elements. For coating mixtures, examples of such conventional additives include colloidal oxides such as colloidal silica or colloidal alumina that can improve the adherence, cohesiveness or mechanical durability of the dried coatings, and in some case can enter into cross-linking reactions. Other coating mixture additions include inorganic reinforcing fibers, e.g., refractory glass or ceramic fibers that can improve coating durability.

For cross-linkable formulations to be extruded into honeycomb cores, additives may be useful for purposes such as improving extrusion behavior and/or enhancing the cross-linking behavior of the extrudate. Particular examples include additions such as emulsifying surfactants that can act as extrusion lubricants as well as participating in cross-linking. An example of such a surfactant is mixture of triethanol amine and tall oil.

The following Table reports an illustrative composition for a honeycomb coating batch mixture suitable for applying a skin coating to an extruded cordierite honeycomb core. The inorganic powder component of the mixture is a cordierite ceramic powder mixture consisting of a combination of two particle size fractions. The cross-link agent utilized in the mixture consists of BERSET® 2700 crosslinker, a cyclic amide condensate commercially available from Bercen, Inc., Cranston, R.I., U.S.A. that exhibits accelerated reactivity upon drying. The cellulosic binder consists of Methocel® A4M methyl cellulose binder, commercially available from the Dow Chemical Company, Midland, Mich., U.S.A.

Optional additives present in this coating mixture include a colloidal silica addition, commercially available as Ludox® HS-40 silica sol commercially available from the Grace Davison group, W. R. Grace & Co, Columbia, Md., U.S.A. Also added is a vitreous aluminosilicate fiber cement mixture, commercially available as Unifrax® QF-180 cement from the Unifrax Corporation, Niagara Falls, N.Y., U.S.A.

TABLE 1

Cordierite Skin Coating Composition

| Component | Percent (Total Batch) |
| --- | --- |
| Coarse cordierite powder | 19.30% |
| Fine cordierite powder (11 μm MPS) | 35.61% |
| Cellulose binder | 0.59% |
| Silica sol | 6.73% |
| Aluminosilicate fiber cement | 37.77% |
| Cyclic amide cross-link agent | 0.14% |
| Water | 7.48% |
| | 100.00% |

Figure 5A:
FIG. 5A is a perspective view of an extruded filter sample comprising a cross-link agent and a sample that does not comprise the cross-link agent.
Figure 5B:
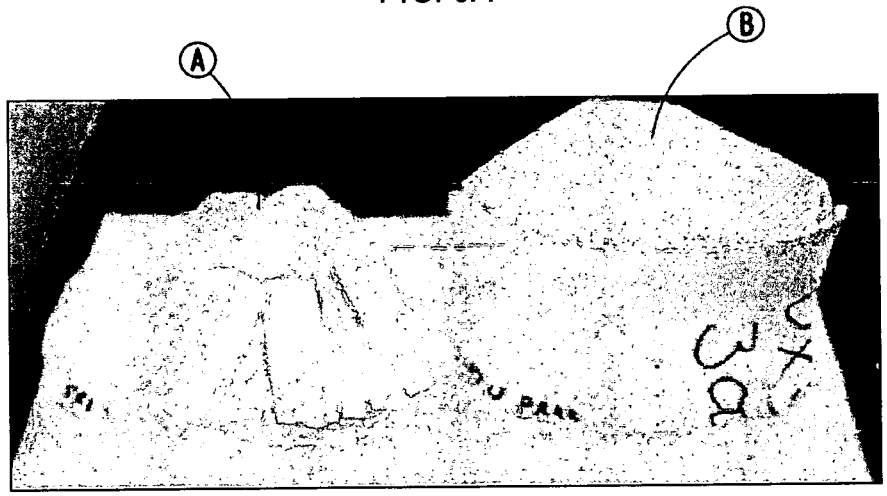
FIG. 5B is a perspective view of a filter sample comprising a cross-link agent and a sample that does not comprise the cross-link agent as subjected to a water exposure.
Figure 5C:
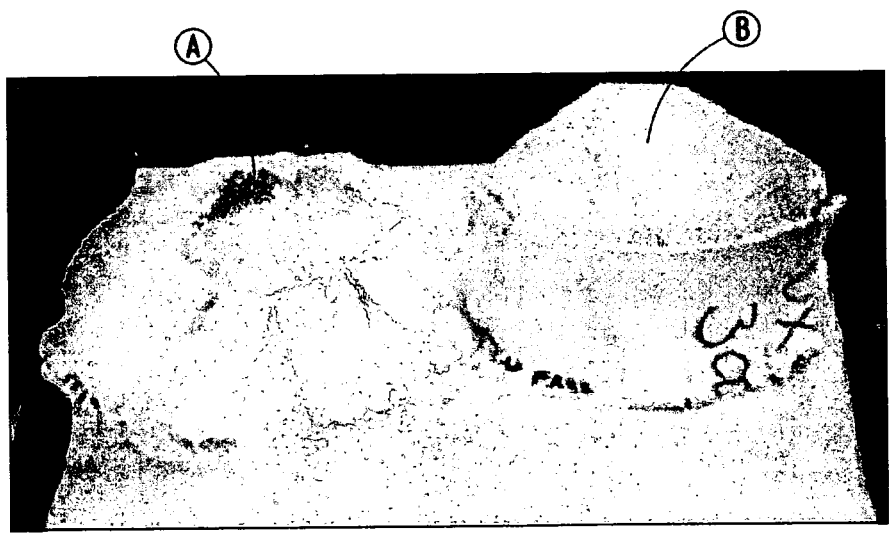
FIG. 5C is a perspective view of a filter sample comprising a cross-link agent and a sample that does not comprise the cross-link agent as subjected to a second water exposure.

The substantially enhanced resistance to water absorption and the resultant-increase of structural integrity that is exhibited by honeycomb core and skin elements comprising cross-linked cellulosic binder components is exemplified in the photographs presented in FIGS. 5A-5C of the drawings. All of the honeycombs depicted in FIGS. 5A-5C are extruded honeycombs wherein both core and skin elements comprised cellulosic binders; however, the extruded honeycombs identified as honeycombs A in the photographs comprised no batch cross-link agent, whereas the honeycombs identified as honeycombs B comprised a cyclic amide cross-link agent such as provided in the skin coating mixture reported in Table 1.

Referring more particularly to the photographs, FIG. 5A shows both honeycombs as originally extruded, with little apparent difference therebetween. FIGS. 5B and 5C show the same samples after water immersions of 25 and 45 minutes, respectively. The structural stability of cross-linked sample B under these water immersion treatments, when compared with the substantially complete collapse of the non-cross-linked sample A under the same treatments, plainly illustrates the advantageous and unexpected effectiveness of binder cross-linking for enhancing the moisture stability of dried ceramic honeycomb compositions.

Of course, the foregoing examples and illustrations are merely illustrative of the invention as it may be practiced within the scope of the appended claims.

We claim:

1. A method for manufacturing a ceramic honeycomb structure comprising the steps of:
   (a) compounding a powder batch mixture for a ceramic core or skin component for a ceramic honeycomb structure comprising at least one inorganic powder, an aqueous vehicle, at least one cross-linkable batch constituent, and at least one batch cross-link agent for the at least one cross-linkable batch constituent;
   (b) forming the batch mixture into a green cellular core or skin component for a honeycomb structure, said structure being a unitary ceramic structure of honeycomb configuration,
   (c) drying the green core or skin component to remove aqueous vehicle therefrom,
   (d) reacting the at least one batch cross-link agent with the at least one cross-linkable batch constituent to produce a cross-linked, unfired core or skin component, and
   (e) subjecting the cross-linked, unfired core or skin component to supplemental processing with an aqueous medium.

2. The method of claim 1 wherein the at least one cross-linkable batch constituent is a water-active organic compound, and wherein supplemental processing comprises contacting the core or skin component with an aqueous catalyst, washcoating or passivating solution.

3. The method of claim 1 wherein the at least one cross-linkable batch constituent is a cellulosic binder and wherein the forming step comprises forming the batch mixture into a ceramic honeycomb skin component on a unitary ceramic core structure of honeycomb configuration.

4. The method of claim 3 wherein the at least one batch cross-link agent is selected from the group consisting of formaldehyde, dialdehyde, acrylic anhydride, diisocyanate, epihalohydrin, polyamide, polyacrolein, polyimine and cyclic amide cross-linking compounds.

5. The method of claim 3 wherein the step of reacting the at least one batch cross-link agent with the at least one cross-linkable batch constituent comprises a reaction with a hydroxyl group via at least one of a condensation mechanism and a ring open mechanism.

6. The method of claim 3 wherein the step of reacting the at least one batch cross-link agent with the at least one cross-linkable batch constituent is accelerated through the application of thermal or electromagnetic energy to the honeycomb skin component.

7. The method of claim 1 wherein the powder batch mixture further comprises at least one optional batch constituent selected from the group consisting of colloidal oxide additions, inorganic reinforcing fibers, and emulsifying surfactants.

8. The method of claim 1 wherein the forming step comprises extruding batch mixture into a honeycomb core component.

9. The method of claim 1 wherein the inorganic powder is selected from the group consisting of oxides, nitrides, carbides, silicates, titanates, aluminates, and mixtures thereof.

10. The method of claim 9 wherein the inorganic powder is of a composition that sinters or reaction-sinters to a stable ceramic of silicate, aluminate, titanate, nitride or carbide structure.

11. A method for manufacturing a ceramic honeycomb structure comprising the steps of:
   (a) compounding a powder batch mixture for a ceramic honeycomb component comprising at least one inorganic powder, an aqueous vehicle, at least one cross-linkable batch constituent selected from the group consisting of binders, lubricants and surfactants, and at least one batch cross-link agent for the cross-linkable batch constituent; the at least one cross-linkable batch constituent comprising a cellulosic binder and the at least one batch cross-link agent being selected from the group consisting of formaldehyde, dialdehyde, acrylic anhydride, diisocyanate, epihalohydrin, polyamides, polyacrolein, cyclic amides, and polyimines;
   (b) forming the batch mixture into a green skin component on a unitary ceramic core component of honeycomb configuration;
   (c) drying the green skin component to remove aqueous vehicle therefrom,
   (d) reacting the at least one batch cross-link agent with the at least one cross-linkable batch constituent to produce a cross-linked, dried, unfired skin component, and
   (e) subjecting the unfired skin component and core component to use as a honeycomb catalyst support, particulate filter, or heat exchanger.

* * * * *